US010802820B2

(12) United States Patent
Konik et al.

(10) Patent No.: US 10,802,820 B2
(45) Date of Patent: Oct. 13, 2020

(54) INTERPRETING AND PRESENTING CODE BASED ON HISTORICAL SENTIMENTS AND INTERACTIONS

(71) Applicant: International Business Machines Corporation, Armonk, NY (US)

(72) Inventors: Rafal P. Konik, Oronoco, MN (US); Alec J. Matschiner, Rochester, MN (US); Avery Granum, Rochester, MN (US); Kyle G. Christianson, Rochester, MN (US); Jim C. Chen, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/030,481

(22) Filed: Jul. 9, 2018

(65) Prior Publication Data
US 2020/0012494 A1    Jan. 9, 2020

(51) Int. Cl.
*G06F 8/71* (2018.01)
*G06F 3/0481* (2013.01)
*G06F 40/40* (2020.01)

(52) U.S. Cl.
CPC .............. *G06F 8/71* (2013.01); *G06F 3/0481* (2013.01); *G06F 40/40* (2020.01)

(58) Field of Classification Search
CPC . G06F 8/71; G06F 8/75; G06F 3/0481; G06F 40/40
See application file for complete search history.

(56) References Cited

U.S. PATENT DOCUMENTS

| 5,513,305 | A | 4/1996 | Maghbouleh |
| 7,167,191 | B2 | 1/2007 | Hull et al. |
| 7,231,135 | B2 | 6/2007 | Esenyan et al. |
| 7,298,930 | B1 | 11/2007 | Erol et al. |
| 7,386,831 | B2 | 6/2008 | Flanagan |
| 7,904,802 | B1 * | 3/2011 | Kolawa ................ G06Q 10/103 715/230 |
| 8,667,401 | B1 * | 3/2014 | Lozben ................ G06F 3/0481 715/719 |
| 9,262,748 | B2 | 2/2016 | Kozloski et al. |
| 9,274,756 | B1 | 3/2016 | Clausen et al. |
| 9,600,244 | B1 | 3/2017 | Hwang et al. |
| 2007/0239649 | A1 * | 10/2007 | Bloesch ............. G06F 11/3676 706/55 |

(Continued)

*Primary Examiner* — Wei Y Zhen
*Assistant Examiner* — Brahim Bourzik
(74) *Attorney, Agent, or Firm* — Patterson + Sheridan, LLP

(57) ABSTRACT

Techniques for cognitive interpretation of source code are provided. Metadata associated with a section of code in a software project is analyzed to determine a change history of the section of code. A plurality of discussions related to the section of code is evaluated, where each of the plurality of discussions occurred during a code review process. Further, a plurality of support records related to the section of code is analyzed. A sentiment score for the section of code is determined based on the associated metadata, the evaluation of the plurality of discussions, and the analysis of the plurality of support records. Additionally, a display color for the section of code is selected based on the sentiment score. Finally, generation of a graphical user interface (GUI) is facilitated, where the GUI displays the first display color in association with the first section of code.

17 Claims, 11 Drawing Sheets

(56) References Cited

U.S. PATENT DOCUMENTS

| | | | |
|---|---|---|---|
| 2008/0066050 A1* | 3/2008 | Jain | G06F 8/71 |
| | | | 717/101 |
| 2008/0295085 A1 | 11/2008 | Rachamadugu et al. | |
| 2009/0119576 A1 | 5/2009 | Pepper et al. | |
| 2010/0106705 A1* | 4/2010 | Rush | G06F 8/36 |
| | | | 707/709 |
| 2010/0162209 A1* | 6/2010 | Brown | G06F 8/73 |
| | | | 717/110 |
| 2011/0307802 A1* | 12/2011 | Gupta | G06F 8/71 |
| | | | 715/751 |
| 2012/0034425 A1 | 2/2012 | Linares | |
| 2013/0074038 A1* | 3/2013 | Fox | G06F 8/70 |
| | | | 717/122 |
| 2014/0173561 A1* | 6/2014 | Toub | G06F 8/73 |
| | | | 717/123 |
| 2016/0300135 A1* | 10/2016 | Moudy | G06F 16/244 |
| 2017/0262360 A1* | 9/2017 | Kochura | G06F 11/3692 |
| 2019/0146784 A1* | 5/2019 | Krauss | G06F 8/73 |
| | | | 717/122 |

* cited by examiner

```
function GetVolume(r) {
    volume = (4/3) * pi * r * r * r;
    return volume;
}
function PerformLoop(array) {
    n = array.size();
    i = 0;
    for (i < n) {
        DoOperation(array[i]);
        i = i + 1;
    }
    return array;
}
```

FIG. 9

INTERPRETING AND PRESENTING CODE BASED ON HISTORICAL SENTIMENTS AND INTERACTIONS

BACKGROUND

The present disclosure relates to evaluating code, and more specifically, to evaluating historical sentiment relating to code and generating dynamic visualizations.

When working on software development projects, programmers and developers rarely know or understand the considerations, backgrounds, and rationale for each piece of code they work with. This is particularly true with larger projects, which may span any number of departments, programmers, companies, and years. Particularly when turnover or movement within the organization occurs, the programmers working on each portion of code will not understand the full history behind the code, which sections are problematic and which sections function well, why particular changes were made, and the like. Even developers who have worked on the software from the beginning are unlikely to recall the details of each section of code. This leads to significant duplication of efforts and reduction in efficiency. Similarly, the quality of the final software project suffers because of the incomplete understanding that each programmer has. While some existing solutions allow developers to add comments to source code as it is drafted, these comments are typically underutilized and when they are included, they are frequently vague or unhelpful.

SUMMARY

According to one embodiment of the present disclosure, a method is provided. The method includes analyzing metadata associated with a first section of code in a software project to determine a change history of the first section of code. The method further includes evaluating a first plurality of discussions related to the first section of code, wherein each of the first plurality of discussions occurred during a code review process. Additionally, a first plurality of support records related to the first section of code is analyzed. Further, the method includes determining a first sentiment score for the first section of code based on the associated metadata, the evaluation of the first plurality of discussions, and the analysis of the first plurality of support records. Finally, the method includes selecting a first display color for the first section of code based on the first sentiment score.

According to a second embodiment of the present disclosure, a computer program product is provided. The computer program product includes a computer-readable storage medium having computer-readable program code embodied therewith, the computer-readable program code executable by one or more computer processors to perform an operation. The operation includes analyzing metadata associated with a first section of code in a software project to determine a change history of the first section of code. The operation further includes evaluating a first plurality of discussions related to the first section of code, wherein each of the first plurality of discussions occurred during a code review process. Additionally, a first plurality of support records related to the first section of code is analyzed. Further, the operation includes determining a first sentiment score for the first section of code based on the associated metadata, the evaluation of the first plurality of discussions, and the analysis of the first plurality of support records. Finally, the operation includes selecting a first display color for the first section of code based on the first sentiment score.

According to a third embodiment of the present disclosure, a system is provided. The system includes one or more computer processors, and a memory containing a program which when executed by the one or more computer processors performs an operation. The operation includes analyzing metadata associated with a first section of code in a software project to determine a change history of the first section of code. The operation further includes evaluating a first plurality of discussions related to the first section of code, wherein each of the first plurality of discussions occurred during a code review process. Additionally, a first plurality of support records related to the first section of code is analyzed. Further, the operation includes determining a first sentiment score for the first section of code based on the associated metadata, the evaluation of the first plurality of discussions, and the analysis of the first plurality of support records. Finally, the operation includes selecting a first display color for the first section of code based on the first sentiment score.

BRIEF DESCRIPTION OF THE SEVERAL VIEWS OF THE DRAWINGS

FIG. 9 illustrates a dynamic visualization of code sentiment, according to one embodiment disclosed herein.

DETAILED DESCRIPTION

Embodiments of the present disclosure provide systems and methods for evaluating source code based on a variety of data sources to determine the sentiment associated with each section, which can inform developers which sections they should focus on, and which are satisfactory. Further, embodiments of the present disclosure enable cognitive association of historical data with each section of code to enable rapid access by future developers, which allows for more complete understanding of each portion of code.

Further, embodiments of the present disclosure utilize dynamically generated graphical user interfaces (GUI) that allow developers to quickly and easily understand source code which they may have never seen before. This allows users who are unfamiliar with a project to quickly understand how the code has evolved, and immediately recognize the problematic and satisfactory areas.

During software development projects, particular sections of code are often more troublesome or problematic than others. For example, one section of code may have been rewritten or modified a large number of times, or a section of code may be associated with a higher number of issues than other portions. Similarly, the developers themselves may regard some sections as being worse. These non-intuitive sentiments are not apparent when other developers view or edit the code, but they can provide valuable insight. Embodiments of the present disclosure provide techniques to interpret, evaluate, and present sentiment associated with source code in a manner that developers can quickly and easily understand. This improves the development process because each developer can efficiently obtain a full understanding of the code. Further, because embodiments provide sentiment analysis, developers can obtain new and unique information about the code that simply does not exist in existing solutions. In some embodiments, rather than simply relying on comments and change logs, other sources of data can be parsed to determine and present the developer sentiment for each portion of code.

Figure 1:
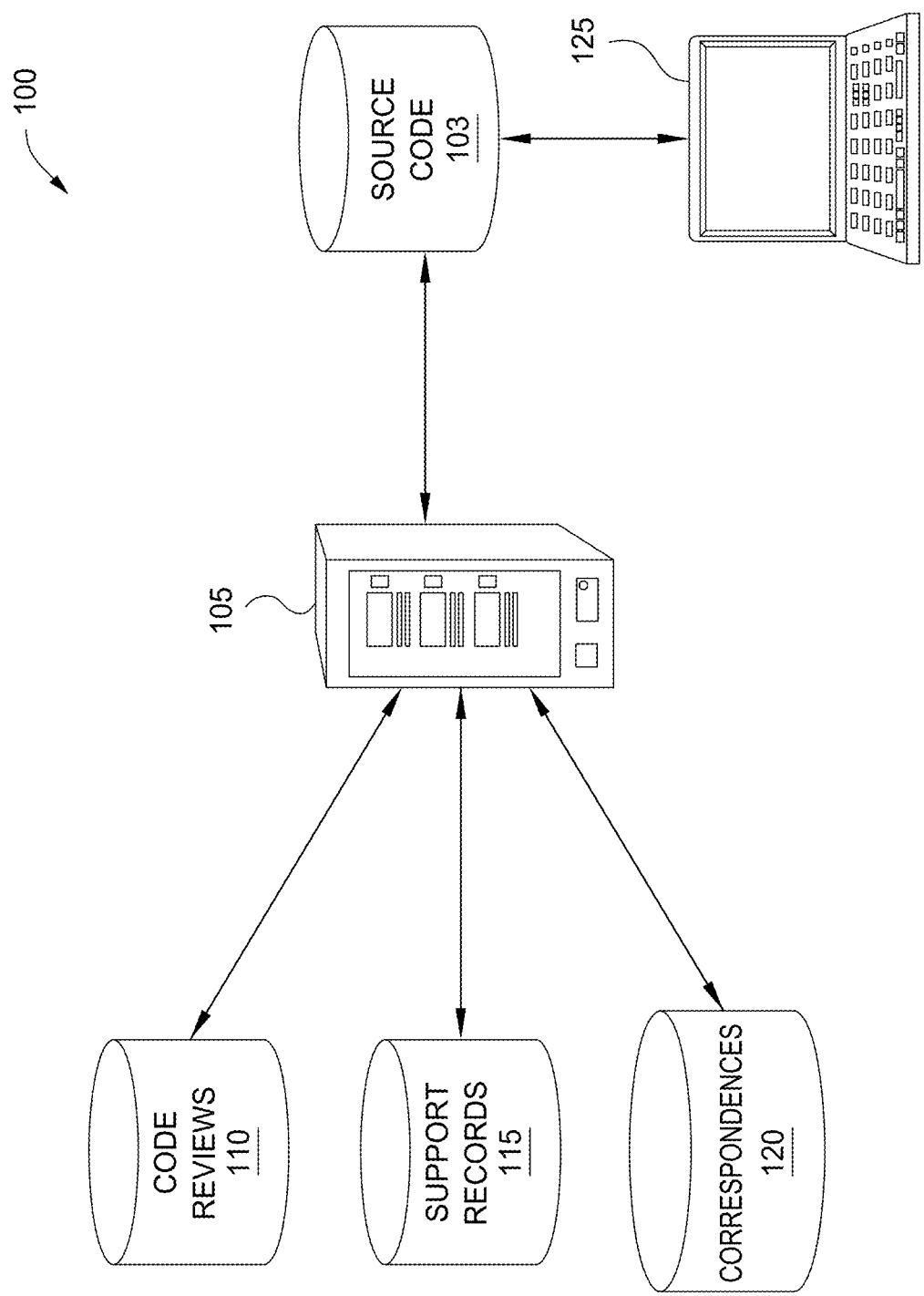
FIG. 1 illustrates a system for interpreting and presenting code based on historical sentiment scores, according to one embodiment disclosed herein.

FIG. 1 illustrates a system 100 for interpreting and presenting code based on historical sentiment scores, according to one embodiment disclosed herein. In the illustrated system 100, a Code Analysis Device 105 is communicatively coupled with a variety of data sources, including Code Reviews 110, Support Records 115, Correspondences 120, and Source Code 103. Further, in the illustrated embodiment, a User Device 125 is communicatively coupled with the repository storing the Source Code 103. In an embodiment, the User Device 125 may be used by a programmer or developer to write, view, and edit the Source Code 103. In the illustrated embodiment, the Code Reviews 110, Support Records 115, Correspondences 120, and Source Code 103 are depicted as residing in separate repositories to aid understanding. However, in various embodiments, each repository may be stored in a single repository, in a remote storage area (such as in the cloud), locally on the Code Analysis Device 105 or User Device 125, and the like.

Further, in embodiments, although the User Device 125 is illustrated as coupled with the Source Code 103, the User Device 125 may also be communicatively coupled with the Code Analysis Device 105, Code Reviews 110, Support Records 115, Correspondences 120, and other data sources and devices. Similarly, although a single User Device 125 is illustrated, in embodiments, there may of course be any number of User Devices 125. Further, in some embodiments, the User Device 125 and Code Analysis Device 105 may operate as a single device or application. As discussed above, in an embodiment, users (i.e., developers or programmers) use the User Device 125 to develop source code for software projects. In embodiments, the users may use applications or programs such as integrated development environments (IDE) to facilitate the programming process.

In the illustrated embodiment, the Code Analysis Device 105 retrieves Source Code 103 and identifies individual portions or sections based on various techniques. In one embodiment, the Code Analysis Device 105 parses the code call tree to identify the structure of the code. In an embodiment, the call tree refers to the various functions and methods that are present in the code and how they are called and interacted with. In some embodiments, the Code Analysis Device 105 also uses one or more natural language processing (NLP) algorithms to parse the Source Code 103. For example, in one embodiment, the Code Analysis Device 105 may evaluate the names of variables, functions, and the like, in order to identify sections and portions of the code in the various data sources, as will be discussed in more detail below.

In an embodiment, the Code Analysis Device 105 may also parse metadata associated with the Source Code 103. For example, in one embodiment, the metadata may include items such as comments that are associated with particular lines or portions of code, as well as change history and other data. In one embodiment, the Code Analysis Device 105 may evaluate the metadata using one or more NLP models as well, as will be discussed in more detail below. In an embodiment, the metadata is associated with particular lines or sections of code (e.g., a comment may be attached to a line, and change logs can reflect the history of each individual line or section). In such an embodiment, the Code Analysis Device 105 may determine a sentiment score for each line or portion of code based on the sentiments expressed in the comments. Similarly, in some embodiments, the Code Analysis Device 105 may generate the sentiment score based in part on the change history of each section.

In some embodiments, the Code Analysis Device 105 may analyze the total number of changes for each section of code, as compared to each other section. In an embodiment, a "change" occurs when the revised code is saved or committed to the repository for Source Code 103. For example, a section that has been changed more times than other sections may be problematic, and therefore the Code Analysis Device 105 may adjust the generated sentiment score. In some embodiments, in addition to the number of changes, the Code Analysis Device 105 may evaluate the frequency of changes. For example, if a particular section of code was originally written relatively recently, it is to be expected that it will have undergone fewer changes than older code. By evaluating the frequency of code changes, the Code Analysis Device 105 can better understand the sentiment associated with the code. Further, in some embodiments, the Code Analysis Device 105 may analyze the temporal aspect of the change history. For example, if a section of code has not been revised or changed recently (or has been changed less frequently in recent time), the Code Analysis Device 105 may determine that the code is not currently problematic, and adjust the sentiment score. In some embodiments, the Code Analysis Device 105 may consider one or more of the above factors (e.g., the total number of changes, the frequency of changes, the recentness of the changes, and the like) in order to determine the overall history and generate a sentiment score reflecting the current code.

In an embodiment, the Code Analysis Device 105 may parse both the current Source Code 103 as well as historical code prior to each change using the NLP models. In this way, the Code Analysis Device 105 can determine which sections of code correspond to each other throughout the changes. For example, based on the comments and code, the Code Analysis Device 105 may determine that a function named "GetVolume" is used to compute the volume of a sphere. Later, the function may be renamed or moved to a different part of the Source Code 103. In an embodiment, the Code Analysis Device 105 may determine that a new function named "ComputeVolume" also computes the volume of the sphere. Based on this NLP, as well as the call tree, the Code Analysis Device 105 may determine that these functions are the same, and the history of one is also the history of the other.

In some embodiments, the Code Analysis Device 105 also evaluates records of Code Reviews 110 to generate sentiment scores. In an embodiment, the Code Reviews 110 include records of code review processes, which generally refers to collaborative meetings where users discuss the Source Code 103, any problems or issues they are facing, plans for moving forward, and the like. In one embodiment, the Code Reviews 110 includes video and/or audio recorded during these sessions. In one embodiment, the Code Analysis Device 105 may parse the audio and/or video using one or more NLP models to determine which section(s) of code is being discussed at any given point. For example, the Code Analysis Device 105 may use one or more speech-to-text models to generate a textual representation of the discussion, and use one or more NLP models to determine what functions or portions of the code are being referred to. Similarly, in one embodiment, the Code Analysis Device 105 may evaluate the video data using one or more optical character recognition (OCR) models to analyze text that is written or displayed during the sessions, to determine which code is being referred to. In this way, the Code Analysis Device 105 can, at any given point in the meetings, identify which section(s) of code the users are interacting with or discussing.

In an embodiment, the Code Analysis Device 105 may further use NLP models to identify the sentiment of the participants, and use this data to generate the sentiment score for each section of code. In some embodiments, the Code Analysis Device 105 may also consider factors such as the volume or volume changes of the users, the speed with which the users are talking, and the like. Similarly, in an embodiment, the Code Analysis Device 105 may perform image processing to identify how animated the participants appear, as well as their facial expressions and body language. In this way, the Code Analysis Device 105 can evaluate the negativity and sentiment of the participants, and generate a more accurate sentiment score for each section of code.

In the illustrated embodiment, the Code Analysis Device 105 may also evaluate other records, such as Support Records 115 and Correspondences 120. In an embodiment, the Support Records 115 correspond to recorded issues or complaints raised by individuals who interact with the Source Code 103 such as users, developers, administrators, and the like. For example, a Support Record 115 may indicate the issue the user is facing (e.g., an error message that is returned when they attempt to use the code), and may also indicate the particular section of code that the issue relates to. In embodiments, each Support Record 115 may include a textual representation of the issue and any solution, an audio recording of the report, and the like. Similarly, in an embodiment, each Correspondence 120 may correspond to an email, text message, chat log, phone conversations, and the like.

In one embodiment, the Code Analysis Device 105 may use one or more NLP models to parse the Support Records 115 and Correspondences 120 to identify which section(s) of code are implicated in each record. Additionally, in some embodiments, some or all of the Support Records 115 may already be associated with a particular section of code, if the complaint or report was sufficiently detailed. In an embodiment, the Code Analysis Device 105 may further parse the records using the NLP models to determine the sentiment of each record. For example, a Correspondence 120 or Support Record 115 may include negative expressions or other factors indicating significant negativity or emotion related to the issue or code. To evaluate this sentiment, the Code Analysis Device 105 may also consider factors such as the formatting of the text (e.g., whether all or portions of the text are in bold, underlined, capital letters, and the like), the volume or pace of any recorded audio, and the like. In an embodiment, in addition to determining the negativity of each record, the Code Analysis Device 105 may generate a sentiment score based in part on the overall number or frequency of records. For example, a higher number of Support Records 115 or Correspondences 120, as well as a higher negativity score for each, may both cause the Code Analysis Device 105 to adjust the sentiment score accordingly. Similarly, more frequent records or more records recently may have a similar effect.

Based on evaluating each of these repositories, the Code Analysis Device 105 can generate a unified and holistic sentiment measure for each section of code that reflects how developers, programmers, and users view and interact with the code. This data enables a deeper understanding of the Source Code 103 than is possible with typical solutions. In some embodiments, these sentiment scores are provided to the programmer or user who is interacting with the Source Code 103 (i.e., editing or programming) via the User Device 125. In some embodiments, the sentiment scores are used to adjust the way the Source Code 103 is displayed. For example, the code may be interpreted and presented in a way that allows the user to immediately visually determine which areas need careful attention, and which areas are sufficiently satisfactory. Further, in some embodiments, the data related to each section of code may be associated with the code and provided to the developer or programmer through one or more links, in order to allow the user to explore the data in more detail.

In one embodiment, the Code Analysis Device 105 may highlight or emphasize sections or portions of code based on the corresponding sentiment score. For example, in one embodiment, the Code Analysis Device 105 may highlight all sections or portions of code with a sentiment score that exceeds a predefined threshold. In some embodiments, a higher sentiment score indicates increased emotion or volatility, indicating that the code requires additional attention. In other embodiments, higher sentiment scores indicate higher satisfaction, while lower scores indicate more negativity. In some embodiments, rather than a binary determination, the displayed Source Code 103 may be adjusted based on a range of values. For example, in some embodiments, the hue, intensity, brightness, or color of each line of code may be adjusted based on the determined sentiment scores. In one embodiment, each section of code is assigned a color based on the sentiment scores, such that a heat map can be generated where more volatile or negative lines of code may appear "hotter" (i.e., redder) and lines of code with fewer problems may appear "colder" (i.e., more blue). Of course, any other gradients or colors may be used in various embodiments. In this way, the user can easily and visually identify which sections of code require further attention.

In various embodiments, the sentiment scores may be generated at various levels of granularity. For example, in one embodiment, sentiment scores are generated for each line of code. In some embodiments, the sentiment scores are computed for each section or block of code, or for each function of code. In some embodiments, if a sentiment score is generated for a function or block of code (e.g., because the function overall was discussed during a code review process), the Code Analysis Device 105 may use this sentiment score for the block of code to affect the score for each individual line within the block. Similarly, in an embodiment, the score of each individual line of code may be used to generate or modify the sentiment score of the larger block or function.

In some embodiments, the granularity is selected by a user or administrator. For example, in one embodiment, the programmer may select whether the visualization is displayed at the level of individual lines of code, at the level of blocks or functions, or at any other level of granularity. In such an embodiment, the user may first identify particular functions or large sections of code that need further attention, then adjust the granularity to identify smaller sections or individual lines of code within a problematic function where attention and efforts should be focused. In this way, embodiments of the present disclosure enable the displayed source code to be dynamically adjusted, which allows software developers to rapidly and dynamically determine where to focus. This can improve the efficiency and accuracy of the development process, yielding improved source code.

Figure 2:
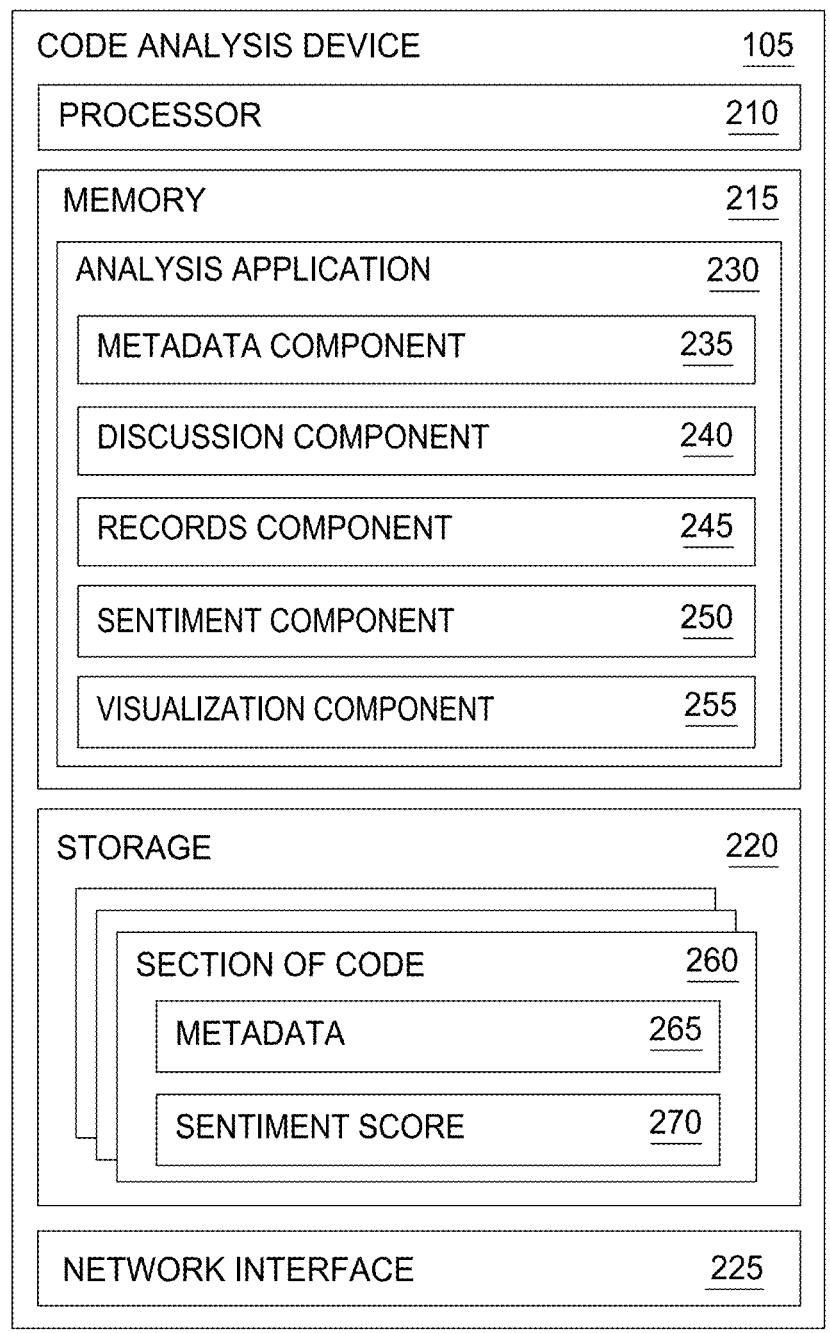
FIG. 2 is a block diagram illustrating a code analysis device for evaluating source code, according to one embodiment disclosed herein.

FIG. 2 is a block diagram illustrating a Code Analysis Device 105 for evaluating source code, according to one embodiment disclosed herein. As illustrated, the Code Analysis Device 105 includes a Processor 210, a Memory 215, Storage 220, and a Network Interface 225. In the illustrated embodiment, Processor 210 retrieves and executes programming instructions stored in Memory 215 as well as stores and retrieves application data residing in Storage 220. Processor 210 is representative of a single CPU, multiple CPUs, a single CPU having multiple processing cores, and the like. Memory 215 is generally included to be representative of a random access memory. Storage 220 may be a disk drive or flash-based storage device, and may include fixed and/or removable storage devices, such as fixed disk drives, removable memory cards, or optical storage, network attached storage (NAS), or storage area-network (SAN). Through the Network Interface 225, the Code Analysis Device 105 may be communicatively coupled with other devices or repositories, including Source Code 103, User Devices 125, Code Reviews 110, Support Records 115, Correspondences 120, and the like.

As discussed above, in some embodiments, one or more of the repositories (Source Code 103, Code Reviews 110, Support Records 115, and Correspondences 120) may be stored locally on the Code Analysis Device 105. Similarly, although not included in the illustrated embodiment, in some embodiments, users, programmers, developers, and administrators may use the Code Analysis Device 105 to prepare and revise source code, such as using one or more IDE. For example, in some embodiments, the Analysis Application 230 may execute on the User Device 125, in order to perform the operations discussed herein locally. In the illustrated embodiment, the Storage 220 includes any number of Sections of Code 260. These sections may be at any granularity, including individual lines, blocks of lines, functions, and the like. In some embodiments, the Analysis Application 230 or another application or device may parse the Source Code 103 to delineate sections. In some embodiments, each Section of Code 260 corresponds to an individual line of code, and Metadata 265 and Sentiment Scores 270 for less granular sections of code (e.g., multi-line blocks or functions) is derived by aggregating the data of each Section of Code 260 (i.e., each line of code) within the broader grouping.

In the illustrated embodiment, each Section of Code 260 is associated with Metadata 265 and a Sentiment Score 270. As discussed above, the Metadata 265 may include code comments left by programmers, as well as change history or change logs. In embodiments, the change history may include when each change occurred. In some embodiments, the change history may also include information such as the user or entity that made the change. In some embodiments, the change history may also include an indication as to what each change was (either indicating the differences, or by including the pre-edited code as well). As discussed above, in embodiments, the Analysis Application 230 may generate the Sentiment Score 270 based on evaluating a variety of data, including the Source Code 103, Code Reviews 110, Support Records 115, and Correspondences 120.

As illustrated, the Analysis Application 230 includes a Metadata Component 235, a Discussion Component 240, a Records Component 245, a Sentiment Component 250, and a Visualization Component 255. Although illustrated as distinct components operating within the Analysis Application 230 for clarity, in embodiments, the functionality of each component may be combined into one or more other components, or may execute on one or more other devices (such as the User Device 125). In an embodiment, the Metadata Component 235 evaluates the Metadata 265 to generate a score corresponding to the sentiment reflected in the Metadata 265 with respect to each Section of Code 260. In embodiments, this metadata score or measure may be used to generate the final Sentiment Score 270, which reflects all available data.

In one embodiment, the Discussion Component 240 evaluates the Code Reviews 110 to generate a score corresponding to the sentiment reflected in those reviews. In an embodiment, the Discussion Component 240 may perform similar evaluations on any discussion, regardless of whether the discussion occurred during a code review process. In some embodiments, the Discussion Component 240 may parse the full recordings in order to identify sections or portions (also referred to as discussions) of each meeting, as well as the Sections of Code 260 each portion corresponds to. In other embodiments, this parsing and identification may be completed by one or more other entities, and the Discussion Component 240 may evaluate each individual discussion (e.g., the audio and/or video corresponding to the particular discussion) to evaluate the negativity or sentiment of each individual discussion. Based on these individual discussion scores, the Discussion Component 240 can generate an overall score for each Section of Code 260, which can be used to further refine the final Sentiment Score 270. In addition to the sentiment expressed in each discussion, in an embodiment, the Discussion Component 240 also considers the total number of discussions, the length of each discussion, the frequency of discussions, how recently each of the discussions occurred, and the like when generating the discussion score or measure.

In an embodiment, the Records Component 245 evaluates the Support Records 115 and Correspondences 120 to generate a score or measure corresponding to the sentiment reflected in these records. In some embodiments, Support Records 115 and Correspondences 120 are both referred to generically as "records" in order to facilitate understanding, because evaluating each record involves similar processing. In one embodiment, the Records Component 245 may analyze each record to identify the Section(s) of Code 260 that the record corresponds to. In embodiments, this may involve identifying data associated with the record which indicates the relevant or related sections, or may involve parsing the record with one or more NLP algorithms, as discussed above. Similarly, the Records Component 245 may analyze each of the records to identify expressions and exclamations, and determine the sentiment of each record. In embodiments, this may comprise utilizing NLP, as well as utilizing speech-to-text algorithms if a record includes audio. Similarly, in embodiments, the Records Component 245 may analyze any audio to identify things like volume changes and tone of voice, as discussed above. Based on the scores for each individual record, the Records Component 245 may generate an overall record score for the Support Records 115 and/or Correspondences 120, which can be used to generate the final Sentiment Scores 270.

In one embodiment, the Sentiment Component 250 evaluates the various scores and measures generated by each other component (e.g., the metadata score, the discussion score, the records score, and the like) and generates an overall Sentiment Score 270 for each Section of Code 260. In embodiments, the generated Sentiment Scores 270 are generated by aggregating the scores generated based on each of the data sources. For example, in one embodiment, the Sentiment Scores 270 are generated by summing each of the partial scores. In another embodiment, the Sentiment Scores 270 may correspond to the average or median of the scores from each data source. In some embodiments, each data source may be weighted differently (i.e., the metadata score may be assigned a first weight, while the discussion score may be assigned a differing weight). In one embodiment, the weighting of each component score may be determined by an administrator or user. In one embodiment, the Sentiment Score 270 ranges from 0 to 1 or from 0 to 100, with scores closer to 1 (or 100) indicating higher emotion and negativity, and scores closer to 0 indicating less volatility and negativity. Of course, in embodiments, the Sentiment Scores 270 may include any range. Similarly, in some embodiments, lower scores indicate more problematic sections of code, depending on the particular implementation.

In some embodiments, the Sentiment Scores 270 are recomputed periodically. For example, in one embodiment, each of the Metadata Component 235, the Discussion Component 240, and the Records Component 245 may periodically determine whether there is any new or updated data relating to each respective Section of Code 260, and generate a revised score if needed. This periodic update may occur, for example, hourly, daily, weekly, and the like. If any of the component scores are changed, the Sentiment Component 250 may similarly revise the final Sentiment Score 270. In contrast, if none of the sub-scores have changed, the Sentiment Component 250 may similarly refrain from re-computing the Sentiment Score 270 for the respective Section of Code 260. In an embodiment, this determination is made separately for each Section of Code 260.

In some embodiments, the scores may be revised upon the happening of one or more predefined triggering events. For example, in one embodiment, whenever the Source Code 103 is finalized or committed to storage by a user, the Analysis Application 235 may determine whether any of the Sections of Code 260 have been modified such that the scores should be revised. For example, the Metadata Component 235 may need to revise one or more metadata scores based on any new or removed comments, as well as any other new change logs. Similarly, the Discussion Component 240 and Records Component 245 may determine whether any prior records or discussions relate to the newly revised Source Code 103, based on analyzing the call tree and function and variable names. For example, suppose a new function, which the participants referred to as a "summarization function" was previously found in a prior discussion or correspondence. If the newly committed Section of Code 260 includes a function with the name "Summarize," it can be determined that this prior identified record or discussion should be evaluated in order to generate a Sentiment Score 270 for the new code. Similarly, in embodiments, each component may determine whether the score for any particular Section of Code 260 should be revised whenever the corresponding data source is updated. For example, when a new code review process occurs, the Discussion Component 240 may evaluate it to identify any affected Sections of Code 260, and revise the scores accordingly.

In an embodiment, the Visualization Component 255 selects or assigns visualizations to each Section of Code 260 based on the corresponding Sentiment Score 270. In one embodiment, this visualization includes assigning a color to each Section of Code 260. As discussed above, in some embodiments, Sections of Code 260 with a Sentiment Score 270 above a predefined threshold may be assigned a first color (e.g., red) while the remaining Sections of Code 260 are assigned a second color (e.g., white, or green). In some embodiments, a range of colors or intensities may be utilized, such that the GUI includes a heat map showing the range Sentiment Scores 270 visualized using colors of differing heats or intensities. Advantageously, this enables rapid and easy review of the Source Code 103. Other visualizations which may be utilized by the Visualization Component 255 may include, without limitation, highlighting one or more Sections of Code 260, changing the formatting (e.g., making the Section of Code 260 bold or underlined, or adjusting the font size of each section), and the like. In embodiments, any visualization technique can be utilized to provide a visual indication of the Sentiment Scores 270. In an embodiment, once the Visualization Component 255 has determined the appropriate modification, the GUI used by the programmer or developer can be updated to reflect the selected visualizations.

Figure 3:
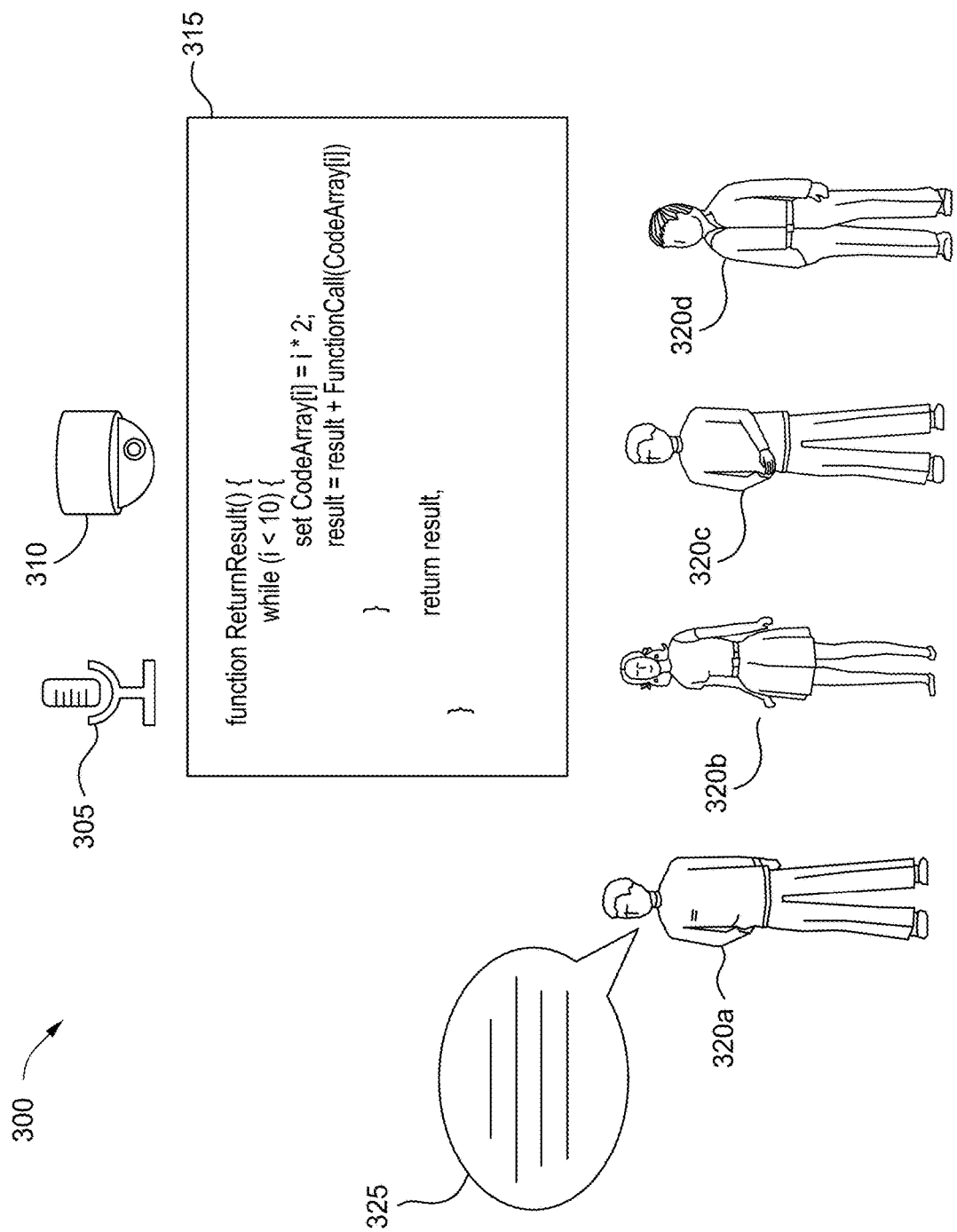
FIG. 3 illustrates a system used in a code review process, according to one embodiment disclosed herein.

FIG. 3 illustrates a system 300 used in a code review process, according to one embodiment disclosed herein. In the illustrated system 300, multiple Participants 320a-d are meeting to discuss one or more software projects. Although illustrated as an in-person meeting, in embodiments, the code review process may occur over the telephone, through video chats, and the like. In the illustrated embodiment, a Display 315 is displaying a block of code corresponding to a function named "ReturnResult." In embodiments, there may or may not be a Display 315 available during the code review process. For example, in some embodiments, the Participants 320a-d may simply discuss any problematic sections of code, without the code being displayed to them. In the illustrated embodiment, the code review meeting is monitored using a Microphone 305 and a Camera 310. Of course, in some embodiments, only a Microphone 305 may be available, or only a Camera 310. In embodiments, the recorded audio and/or video is evaluated by the Discussion Component 240 to identify any Sections of Code 260 that are discussed, and to determine the sentiment associated with each discussed Section of Code 260.

In one embodiment, the recorded audio is processed with a speech-to-text model to generate a textual representation of the discussion, and the text is analyzed with one or more NLP models to identify any Sections of Code 260 that are discussed. Similarly, in an embodiment, the recorded video is evaluated with one or more OCR models to identify any Sections of Code 260. For example, if a Display 315 is used, the displayed code may be scanned to determine which Section of Code 260 the Participants 320a-d are discussing. In embodiments, this identification may be performed in real-time during the meeting, or may be performed on the recording once the code review has completed. In an embodiment, the entire meeting is delineated into a series of discussions, which may be based at least in part on the Section(s) of Code 260 that are discussed in each discussion.

For each identified discussion, the audio and video may be evaluated as discussed above. For example, in an embodiment, the audio may be evaluated to identify tone, pace of speech, volume (and volume changes), and the like. Further, in an embodiment, the speech is parsed with NLP models to identify exclamations and positive or negative expressions. Based on each of these factors, the Discussion Component 240 can generate a discussion score for the Section(s) of Code 260. Similarly, in some embodiments, the recorded video is analyzed to identify facial expressions, how animated the Participants 320a-d are, body language, and the like. For example, if a Participant 320 is smiling and gesturing rapidly, the Discussion Component 240 may determine that they are excited about the relevant Section(s) of Code 260, which is a positive interaction. Conversely, if the Participant 320 is frowning or resting her head on her hands, the Discussion Component 240 may identify this as frustration, and determine that this discussion is negative.

As discussed above, in embodiments, the granularity of the Sections of Code 260 may vary. For example, if the Participants 320a-d are discussing a function or block of code, the discussion may be evaluated to refine the discussion score of each line of code within the specified function or block. In some embodiments, if the Discussion Component 240 can determine with more granularity which line(s) is being discussed, the related discussion may be used to affect only those line(s). For example, a discussion may relate to the overall function, while some portion of the discussion may involve a particular line or lines. In such an embodiment, the Discussion Component 240 can identify this granularity, and adjust the score of the corresponding line(s).

Figure 4:
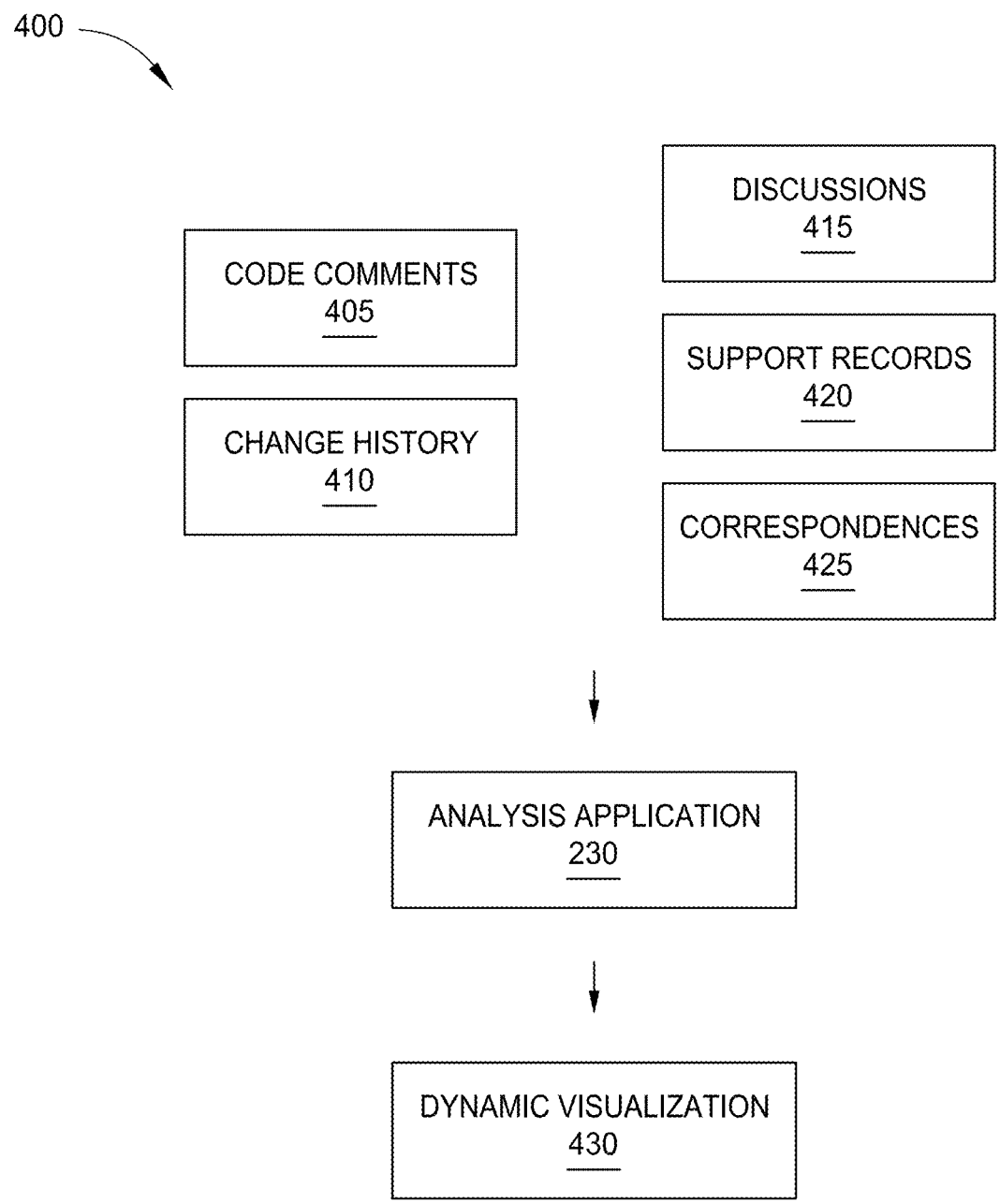
FIG. 4 illustrates a workflow for evaluating code and generating dynamic visualizations on graphical user interfaces, according to one embodiment disclosed herein.

FIG. 4 illustrates a workflow 400 for evaluating code and generating dynamic visualizations on graphical user interfaces, according to one embodiment disclosed herein. As illustrated, a number of data sources are ingested and evaluated in order to generate dynamic visualizations. In the illustrated embodiment, Code Comments 405, Change History 410, Discussions 415, Support Records 420, and Correspondences 425 are ingested by the Analysis Application 230. Of course, in embodiments, various other sources of data may also be evaluated. As discussed above, the Analysis Application 230 evaluates these data sources and generates Sentiment Scores 270 for each Section of Code 260 in any number of software projects. Based on these scores, one or more visualizations are generated by the Analysis Application 230. In the illustrated embodiment, the Dynamic Visualization 430 is displayed on a display device of the user, programmer, or developer. The Dynamic Visualization 430 is updated to display the determined visualization, which deepens the user's knowledge and understanding of the source code.

Figure 5:
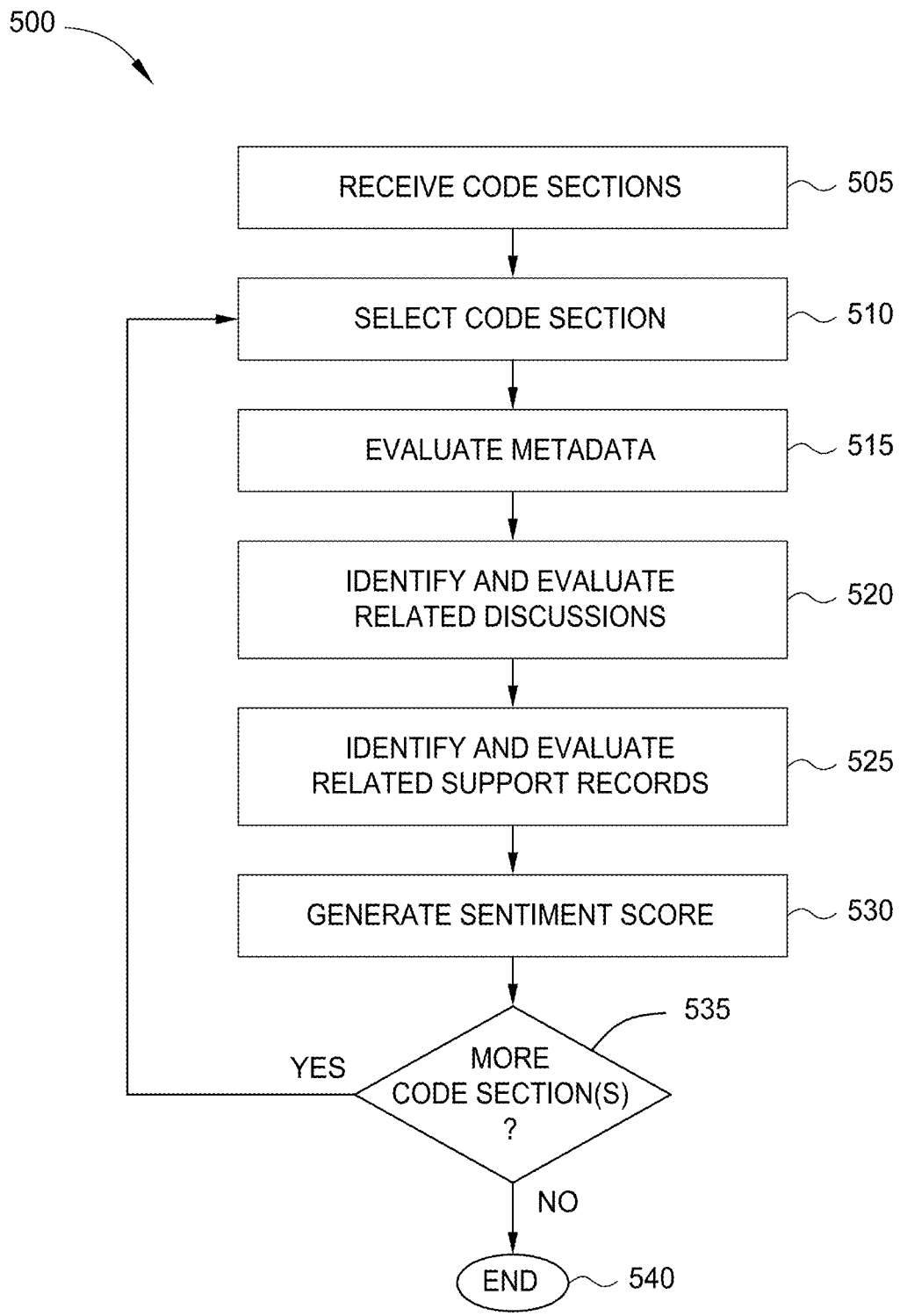
FIG. 5 is a flow diagram illustrating a method for evaluating source code, according to one embodiment disclosed herein.

FIG. 5 is a flow diagram illustrating a method 500 for evaluating source code, according to one embodiment disclosed herein. The method 500 begins at block 505, where the Analysis Application receives code sections. In some embodiments, the code may be delineated into sections based on user preferences, parsing the code call tree, evaluating the source code using one or more NLP models, and the like. In some embodiments, the source code may be delineated into sections of varying size, such as classes, functions, lines of code linked by some logical structure, blocks, and individual lines of code. In this way, the Analysis Application 230 can identify the relevant section(s) of code that are being discussed, regardless of whether the code is referred to by its function or method name, class name, the operations it performs, line number, and the like. In some embodiments, the Analysis Application 230 parses the source code to demarcate it into code sections, rather than receiving the code sections themselves.

At block 510, the Analysis Application 230 selects a first code section. As discussed above, in various embodiments, the code may be evaluated line-by-line (i.e., each code section corresponds to a particular line), or in larger sections (i.e., logically linked blocks of code, functions, methods, classes, and the like). In some embodiments, the Analysis Application 230 evaluates the code at multiple different levels of granularity, and aggregates the scores generated at each level. For example, in one embodiment, the Analysis Application 230 may first evaluate each individual line of code and assign sentiment scores to each. In an embodiment, each function may then be evaluated separately, in order to generate sentiment scores at the function-level. In some embodiments, the score of the function may be based at least in part on the score of each individual line within the function. In some embodiments, the score of each individual line may also be affected by the score of the overall function. For example, if a particular line has a high sentiment score (indicating negativity) but the broader function has a very low score (indicating positivity), in some embodiments, the score of the individual line may be decreased or improved somewhat, and vice versa.

The method 500 then proceeds to block 515, where the Analysis Application 230 evaluates the metadata associated with the selected section. As discussed above, in various embodiments, this may include parsing any comments that are linked to the section. In some embodiments, evaluating the metadata also includes identifying other comments linked to other sections of code, where the comment refers to the selected section. For example, suppose another section of code is associated with a comment such as "This method is far slower than the SelectedFunction method. Revise this one similarly to that method." In an embodiment, when a section of code corresponding to "SelectedFunction" is selected (i.e., one or more lines within the function are selected), this comment may also be evaluated to generate the metadata score, even though the comment is not linked or attached to the selected section.

At block 520, the Analysis Application 230 identifies and evaluates any discussions related to the selected section of code. In some embodiments, identifying related discussions comprises parsing the recorded audio and/or video from one or more meetings (such as code review sessions) using one or more NLP models to identify which sections of code are being discussed at each point in time. Similarly, as discussed above, the Analysis Application 230 may parse the source code with one or more NLP models, as well as evaluating the call tree. In some embodiments, the Analysis Application 230 may also evaluate any comments in the code with the NLP models in order to determine the functionality or naming conventions for each section of code. In this way, the Analysis Application 230 can identify which section(s) of code are being referred to, based on the functions or operations the code performs, the functions which call or refer to the selected code, the names of classes, functions, methods, and variables in the code, and the like.

As discussed above, once the related discussions are identified, the Analysis Application 230 may evaluate the discussions using various methodologies to generate a discussion score for the selected section of code. In embodiments, this score may be based on a variety of factors such as the volume of the discussions, words or sentiments expressed in the discussions, the number or frequency of discussions, and the like. The method 500 then proceeds to block 525, where the Analysis Application 230 identifies and evaluates any records (such as support records, complaint records, correspondences, and the like) that are related to the selected section of code. In an embodiment, this identification process is performed by parsing the records with one or more NLP models, as discussed above.

In some embodiments, in order to identify the related discussions and records, the Analysis Application 230 considers the date and time at which the discussion or record was recorded, in order to determine which version of the source code is being discussed. In some embodiments, the discussion or record may also specify which version is implicated. In this way, the Analysis Application 230 can determine whether the discussion is still relevant to the current code. In some embodiments, older records and discussions are afforded less weight than more recent data.

The method 500 then proceeds to block 530, where the Analysis Application 230 generates an overall sentiment score for the selected code section, based on the metadata score, discussion score, and records score. At block 535, the Analysis Application 230 determines whether there are additional code sections that require processing. If so, the method 500 returns to block 510. If none of the code sections require further evaluation (e.g., because there have been no new discussions or correspondences, or edits to the code), the method 500 terminates at block 540.

Figure 6:
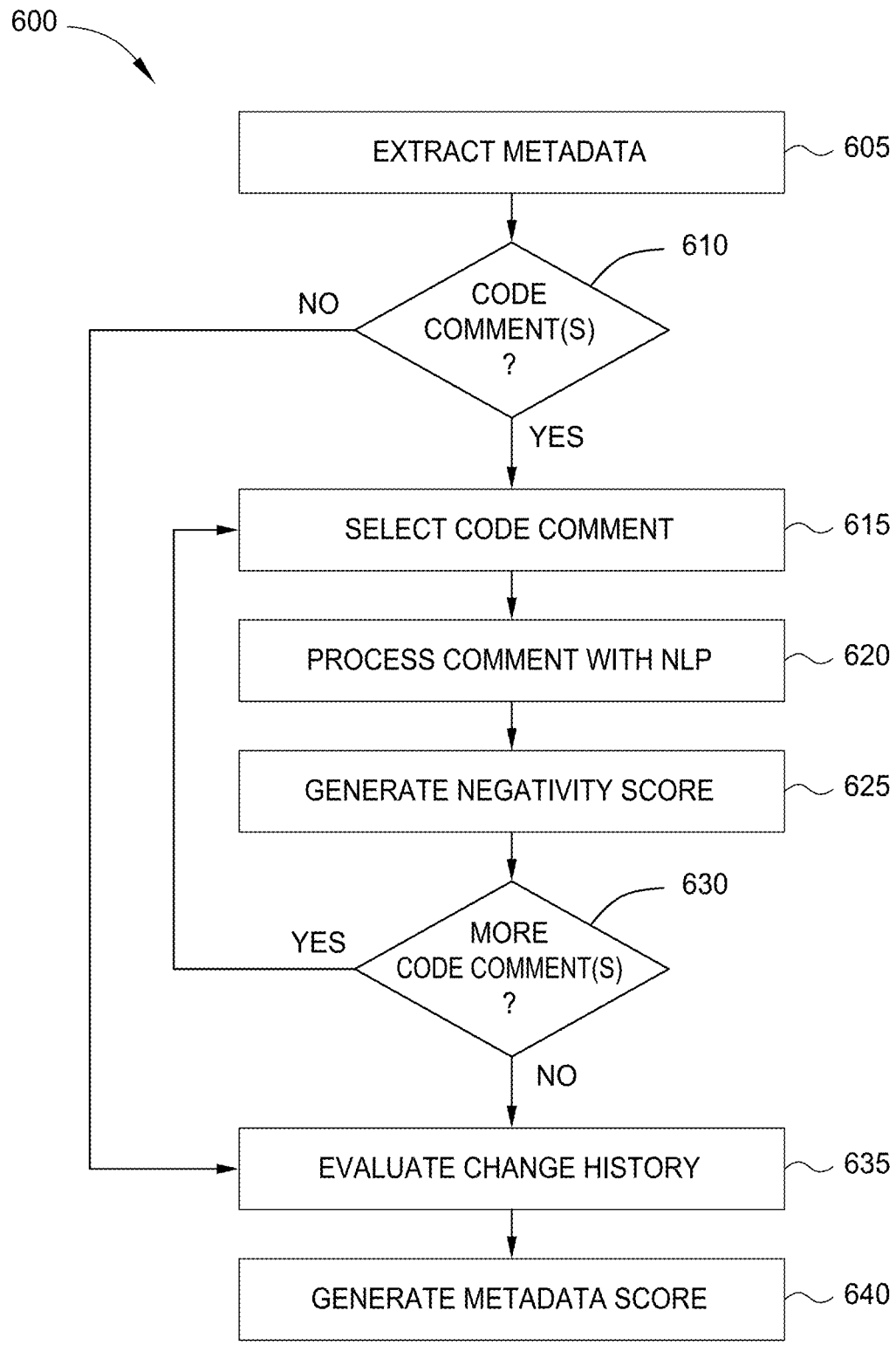
FIG. 6 is a flow diagram illustrating a method for evaluating source code based on associated metadata, according to one embodiment disclosed herein.

FIG. 6 is a flow diagram illustrating a method 600 for evaluating source code based on associated metadata, according to one embodiment disclosed herein. In an embodiment, the method 600 includes additional detail for the operations corresponding to block 515 in FIG. 5. In an embodiment, the method 600 may be completed for each identified section of code. The method 600 begins at block 605, where the Metadata Component 235 extracts metadata from the source code. As discussed above, this may include extracting comments associated with the selected section of code, as well as comments linked to other sections of code. In some embodiments, comments may also be stored in line with the code. In such an embodiment, the Metadata Component 235 may also extract these comments and evaluate them using the same techniques as metadata comments. Further, as discussed above, in some embodiments, the metadata includes change history or change logs relating to the selected section of code.

The method 600 then proceeds to block 610, where the Metadata Component 235 determines whether there are any comments associated with the selected code section. As discussed above, in embodiments, this may include extracting comments that are linked to the section, as well as identifying comments that mention or discuss the section. If not, the method proceeds to block 635, discussed below in more detail. If there is at least one comment related to the section, the method 600 continues to block 615, where the Metadata Component 235 selects a first code comment that is related to the section of code. At block 620, the Metadata Component 235 processes the selected comment using one or more NLP models to evaluate the negativity or sentiment expressed in the comment. In embodiments, this may include identifying positive and negative expressions, exclamations, and the like. Similarly, in some embodiments, the Metadata Component 235 may also evaluate the formatting of the comment, such as the capitalization, font size, whether it is bold, underlined, or highlighted, and the like.

The method 600 continues to block 625, where the Metadata Component 235 generates a negativity score for the selected comment, based on the NLP analysis and any other analysis performed on the comment. At block 630, the Metadata Component 235 determines whether additional comments remain to be processed. If so, the method 600 returns to block 615 to select the next comment. Otherwise, the method 600 continues to block 635, where the Metadata Component 235 evaluates the change history of the section of code. In some embodiments, frequent changes or a large number of changes may indicate more volatility or frustration with the code, and therefore lead to a higher metadata score. Similarly, in some embodiments, if the code has not been revised recently (or has been revised less frequently), the Metadata Component 235 may generate a lower metadata score because the code section is relatively stable, at least recently. In various embodiments, the Metadata Component 235 may also consider the magnitude of each change (e.g., how significant the changes were, and how many lines were affected by it).

Finally, at block 640, the Metadata Component 235 generates a metadata score for the section of code, which is a sentiment measure that is based on the metadata associated with the code. In an embodiment, to generate the metadata score, the Metadata Component 235 may aggregate the negativity scores generated for each individual comment. This aggregation may comprise summation, finding the average or median score, and the like. In some embodiments, the Metadata Component 235 also considers the total number of comments, the frequency of the comments, and the like. In some embodiments, newer comments are given higher weight than older comments. In one embodiment, the Metadata Component 235 also considers deleted comments, but may assign an even lower weight to these deleted comments. In one embodiment, in addition to or rather than simply reducing the weight of older comments or changes, the Metadata Component 235 may reduce the negativity score of the older data. For example, in such an embodiment, the metadata score of a section of code may decrease over time, even without new data indicating a positive response, simply because no additional negative comments or changes have been identified. In this way, the final sentiment scores may more accurately reflect the current attitudes towards the section of code, rather than purely historical attitudes.

Figure 7:
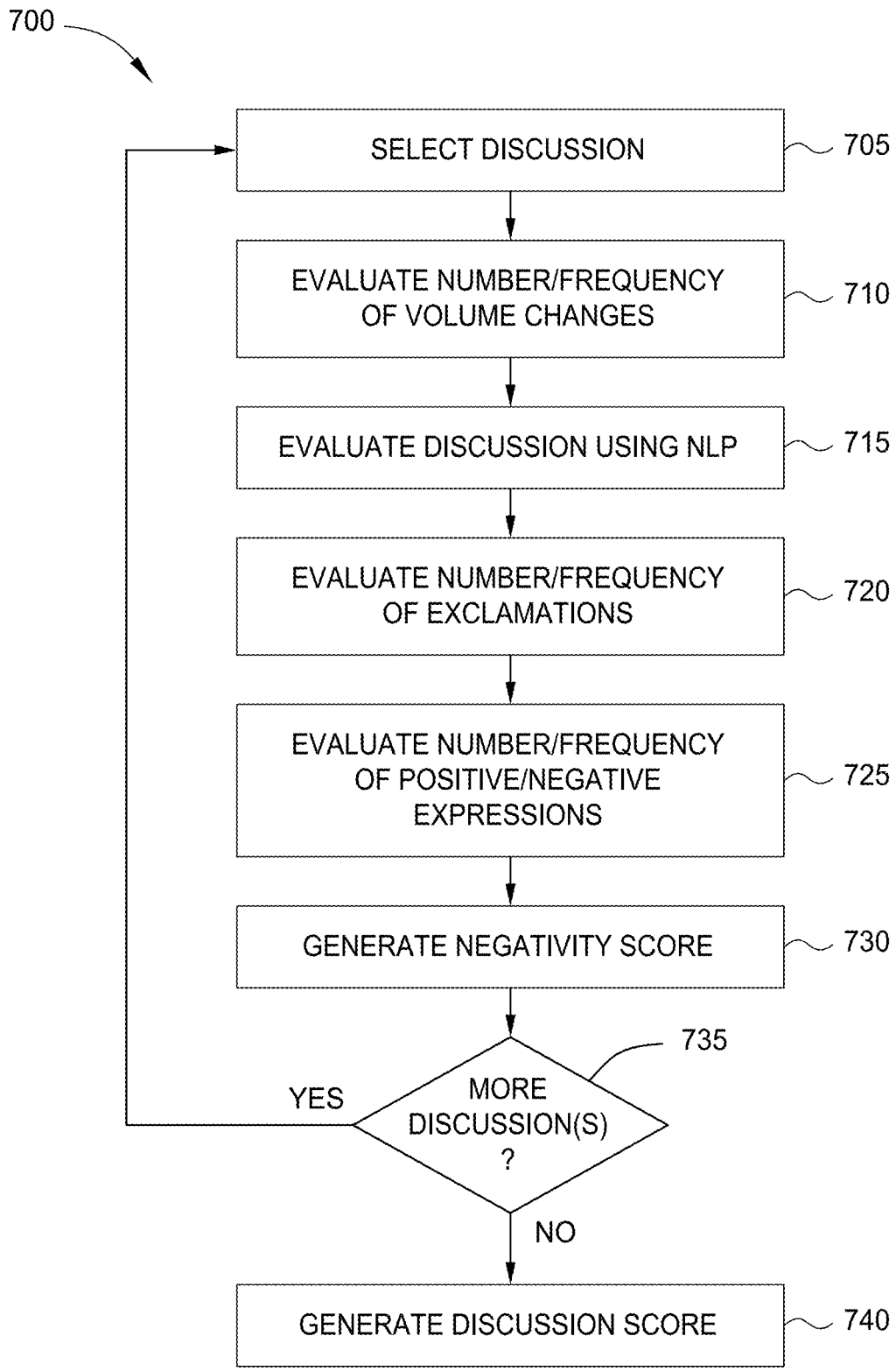
FIG. 7 is a flow diagram illustrating a method for evaluating source code based on related collaborative discussions, according to one embodiment disclosed herein.

FIG. 7 is a flow diagram illustrating a method 700 for evaluating source code based on related collaborative discussions, according to one embodiment disclosed herein. In an embodiment, the method 700 includes additional detail for the operations corresponding to block 520 in FIG. 5. In an embodiment, the method 700 may be completed for each identified section of code. The method 700 begins at block 705, where the Discussion Component 240 selects a first discussion related to the selected section of code. At block 710, the Discussion Component 240 evaluates the number and/or frequency of volume changes in the discussion. For example, if a given discussion includes frequent volume changes, the Discussion Component 240 may determine that the participants are energized. This determination may inform the magnitude of the emotional reaction. That is, if the Discussion Component 240 determines that the discussion is negative, the volume of the discussion may indicate it is particularly negative. Similarly, if the discussion is positive, the louder volume may indicate that it is a significantly positive discussion.

In some embodiments, the Discussion Component 240 may also evaluate the pace with which the participants talk, the tone of the participants, and the like. In some embodiments, the Discussion Component 240 may also evaluate the body language of the participants, the facial expressions they make, and the like. The method 700 then proceeds to block 715, where the Discussion Component 240 evaluates the discussion using one or more NLP models. At block 720, based on this evaluation, the Discussion Component 240 analyzes the number and/or frequency of exclamations during the discussion. In an embodiment, a higher number or frequency of exclamations may similarly increase the magnitude of the generated negativity score, because it may indicate strong emotions (whether positive or negative). At block 725, the Discussion Component 240 evaluates the number and/or frequency of positive and negative expressions. In one embodiment, positive and negative expressions are identified based on predefined keywords (such as "good," "bad," "slow," "perfect," and the like).

The method 700 then proceeds to block 730, where the Discussion Component 240 generates a negativity score for the selected discussion. In some embodiments, in addition to the above factors, the Discussion Component 240 may also consider the length of the selected discussion. Additionally, in some embodiments, the Discussion Component 240 considers how recently the discussion occurred. For example, if the discussion is associated with an old version of the section of code, the negativity score may be reduced, or the weight of the score may be reduced when generating the final discussion score. At block 735, the Discussion Component 240 determines whether there are additional discussions related to the section of code. If so, the method 700 returns to block 705. If not, the method 700 continues to block 740, where the Discussion Component 240 generates a discussion score based on the generated negativity scores for each discussion. In some embodiments, the Discussion Component 240 may also consider the number or frequency of the discussions, as well as how many discussions have occurred recently (e.g., within a predefined time period). If fewer discussions have occurred recently, the discussion score may be reduced.

Figure 8:
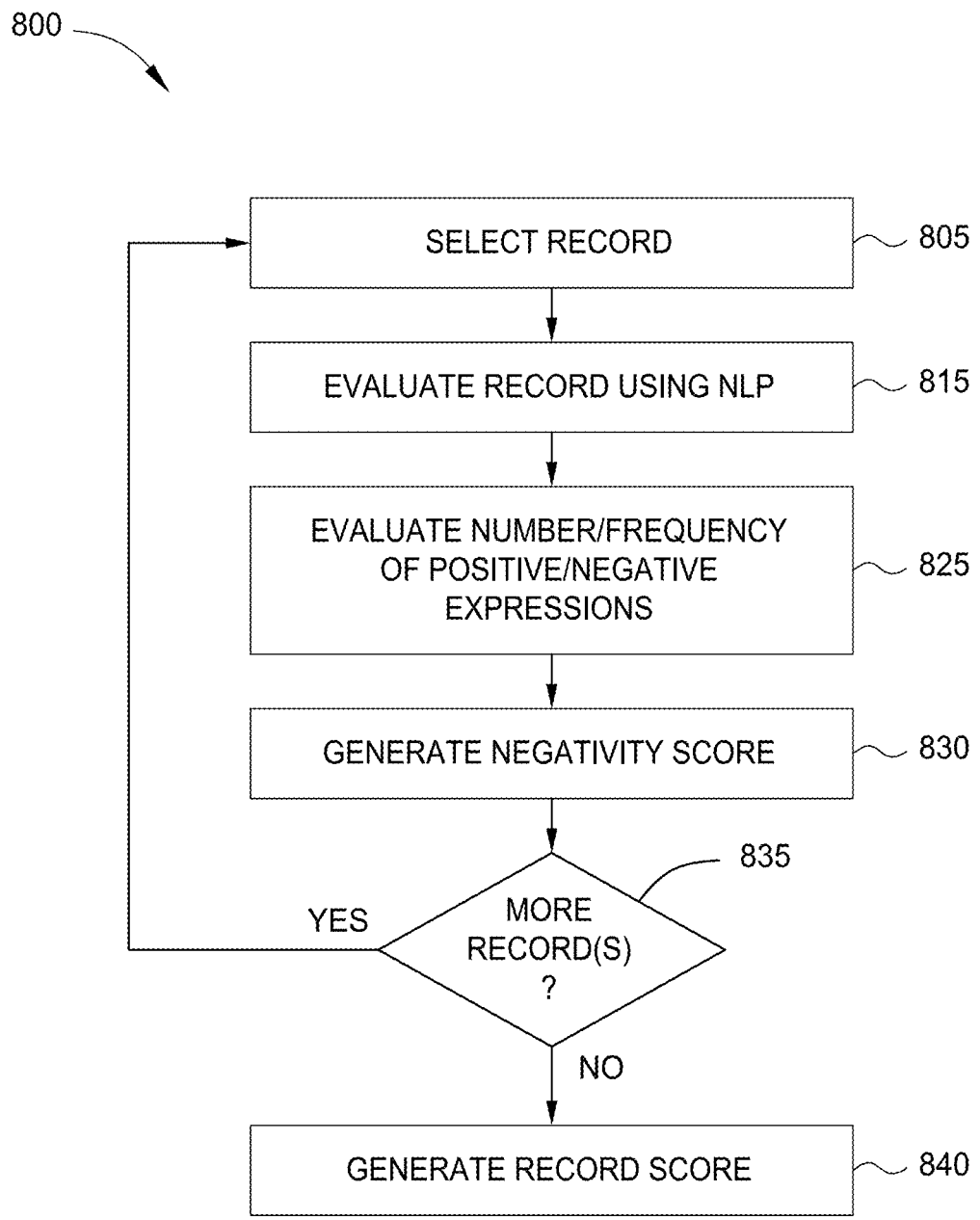
FIG. 8 is a flow diagram illustrating a method for evaluating source code based on related support records and correspondence, according to one embodiment disclosed herein.

FIG. 8 is a flow diagram illustrating a method 800 for evaluating source code based on related support records and correspondence, according to one embodiment disclosed herein. In an embodiment, the method 800 includes additional detail for the operations corresponding to block 525 in FIG. 5. In an embodiment, the method 800 may be completed for each identified section of code. The method 800 begins at block 805, where the Records Component 245 selects a first record associated with the section of code. As discussed above, in an embodiment, the record may be a support record, a complaint record, a correspondence, and the like. At block 815, the Records Component 245 evaluates the selected record using one or more NLP models. The method 800 then proceeds to block 825, where the Records Component 245 evaluates the number and/or frequency of positive and negative expressions in the record, based on the results of the NLP. In an embodiment, the frequency of positive and negative expressions may correspond to the number of such expressions, as compared to the total length of the record.

In some embodiments, the Records Component 245 also analyzes other aspects of the selected record, such as the formatting, capitalization, whether any portions are bold, underlined, or highlighted, and the like. Additionally, in one embodiment, if there is audio associated with the record, the Records Component 245 analyzes the audio as discussed above with reference to the Discussion Component 240. The method 800 then proceeds to block 830, where the Records Component 245 generates a negativity score for the selected record based on these factors. At block 835, the Records Component 245 determines whether additional related records remain to be processed. If so, the method 800 returns to block 805. If not, the method 800 continues to block 840, where the Records Component 245 generates the record score for the section of code.

In one embodiment, the record score is generated based at least in part on each of the generated negativity scores for the related records. In some embodiments, the Records Component 245 may also consider the total number of records, the frequency of the records, and the like. Similarly, in some embodiments, older records may be weighted less than more recent records. Additionally, in some embodiments, the negativity score of older records is reduced, such that the records score may decrease over time, due to the fact that no new negative records are identified, even if the absence of new positive records. In an embodiment, based on the records score, the discussion score, and the metadata score, the Sentiment Component 250 generates an overall sentiment score for each section of code.

In some embodiments, in addition to weighting older items lower than newer items and reducing the scores of older items, the Analysis Application 230 may also remove certain items (e.g., discussions, records, metadata, and the like) from consideration. For example, if a newer discussion or record indicates that an older discussion or record is no longer applicable, the Analysis Application 230 may ignore the older item when calculating the sentiment score, because the issue has been resolved. In other embodiments, the older item may still be considered, but the sentiment score may nevertheless improve based on the score generated for the new discussion, which may offset the older score partially or entirely.

FIG. 9 illustrates a dynamic Visualization 900 of code sentiment, according to one embodiment disclosed herein. In the illustrated embodiment, several lines of code are depicted on a display or GUI, such as in an IDE used by a programmer or developer to develop software projects. Although the illustrated embodiment includes lines 901 through 915, as indicated by the ellipses in lines 901 and 915, the source code may be any length. In the illustrated embodiment, the Visualization 900 includes a section 930 that displays the source code itself, a section 925 that displays the corresponding line numbers, and a section 920 that includes the dynamic visualization of the generated sentiment scores. In the illustrated embodiment, the visualization is displayed in a separate section adjacent to the source code, in order to ensure that the source code remains legible. In some embodiments, however, the visualization may include adding colors or highlighting to the source code itself (such as by changing the background color of each line, or changing the color of the text itself).

In some embodiments, the visualization may be toggled on and off by the user, in order to avoid distraction or improve readability of the code. Further, in some embodiments, the user may dynamically adjust the granularity of the visualization. For example, in the illustrated embodiment, the visualization is on a per-line basis. In one embodiment, the user may toggle the visualization between differing scopes, such as between a per-line basis and a per-function basis. In the illustrated embodiment, the visualization includes colors corresponding to black, white, and various shades of gray. In some embodiments, however, the visualization may include full color, such as using red colors for sections with high sentiment scores, blue or green for sections with low sentiment scores, and a range of colors between the extremes to represent intermediate values. In some embodiments, the user may select the particular visualization preferred (e.g., color depictions, changing the formatting of the text, and the like), as well as the color scheme used.

In the illustrated embodiment, the colors are blended between lines, to create a smooth transition gradient between differing colors (and between differing sentiment scores). In some embodiments, the colors may be unblended, such that each section of code receives a particular color, and the adjacent sections of code may display differing colors without blending or gradient between them. In the illustrated embodiment, darker colors indicate higher sentiment scores, and lighter colors indicate lower sentiment scores. In an embodiment, higher sentiment scores may correspond to higher negativity relating to the section of code, indicating that a user should focus on these sections when revising the source code. As illustrated, lines 903, 906, and 909 are displayed with dark colors, indicating high sentiment scores.

By referring to the Visualization 900, users can quickly and easily identify problematic areas of code that may require revisions or additional attention. Advantageously, these problematic areas of code are identified based on the historical emotion and sentiment associated with them, and not simply based on the number of issues or bugs. Instead, the human emotions which have been expressed in relation to each section of code is evaluated and represented in a sentiment score, which allows the user to build a more holistic understanding of the code, and improves the efficiency and speed of the software development process. Similarly, the code itself may be improved because the programmers and developers have a fuller understanding of the history of the code, and can better revise it to correct any issues.

Figure 10:
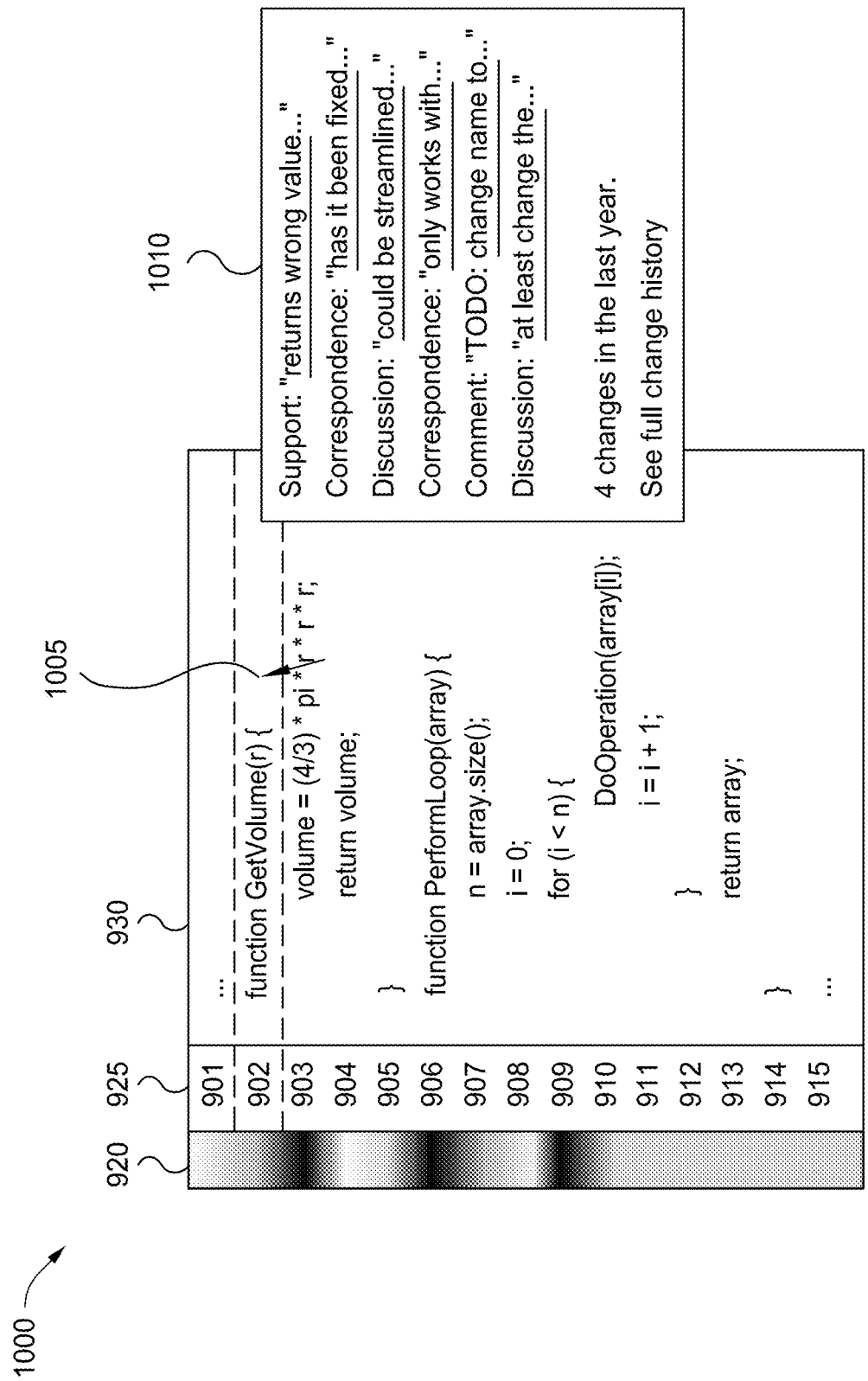
FIG. 10 illustrates interaction with a dynamic visualization of code sentiment, according to one embodiment disclosed herein.

FIG. 10 illustrates interaction with a dynamic visualization 1000 of code sentiment, according to one embodiment disclosed herein. In the illustrated embodiment, a user has moved the cursor 1005 on the GUI of the User Device 125 to select line 902, as illustrated by the dashed lines. Although dashed lines are illustrated to depict the selection, in embodiments, the display of the source code may remain unchanged. In an embodiment, selecting a section of code may comprise clicking the section, hovering over the section, and the like. In some embodiments, the user may select the section of code itself (i.e., within section 930 of the display), or may select the line number or the visualization in section 920. In some embodiments, the selection may also be made via other input methods, such as a touch screen, a microphone, and the like. In some embodiments, the user may similarly select multiple lines of code (e.g., by clicking each separately, or by clicking and dragging across the multiple lines).

In the illustrated embodiment, a window 1010 is displayed over the GUI. As illustrated, the window 1010 includes information about the identified data that is relevant or related to the selected section of code. Although illustrated as a pop up window, in embodiments, this information may be presented to the user in any number of ways. In an embodiment, when a section of code is selected, the Analysis Application 230 may provide information about the section of code, such as support records that implicate the code, correspondences mentioning or discussing the code, recorded discussions (such as during a code review process) that involve the code, and the like. In some embodiments, the Analysis Application 230 may also provide the sentiment score to be displayed in the window 1010. In one embodiment, the Analysis Application 230 also provides the score of each identified piece of data, and/or each of the sub-scores (e.g., the metadata score, the discussions score, and the records score) for display. In some embodiments, the window 1010 includes a scroll feature or other technique that allows the user to view additional items than the ones that are initially displayed. In some embodiments, the number of items displayed is determined based on input from the user.

In the illustrated embodiment, the window 1010 displays each piece of data (e.g., each record, discussion, and the like) as an ordered list. In one embodiment, the items are ordered based on how recently they occurred. In some embodiments, the user may use the GUI to change the ordering, such as to re-sort the items based on their respective scores, the type of the data (e.g., support record, comment, discussion, correspondence, etc.), and the like. In a related embodiment, the user can apply filters to the data set. For example, the user may filter out all correspondences from the list, remove items outside of a defined period of time, remove items with negativity or sentiment scores above or below a threshold, and the like. In some embodiments, as the user applies these filters, the visualization 920 is dynamically adjusted to reflect the filtered data. For example, in such an embodiment, if the user filters out all items older than six months, the Analysis Application 230 re-scores one or more of the sections of code and updates the displayed visualization to reflect the revised scores. In embodiments, this iterative filtration can be applied before or after the user has selected a section of code.

In the illustrated embodiment, each item on the list includes an indication as to the type of data included in the item, followed by a brief snippet of the item. In some embodiments, the snippet corresponds to a predefined number of textual characters retrieved from the item (either directly or through speech-to-text models). In one embodiment, the snippet is taken from the beginning of the item. In some embodiments, the snippet is dynamically selected by the Analysis Application 230 based on a variety of factors. For example, in one embodiment, the Analysis Application 230 selects a snippet that includes the most negative or most positive words or expressions that were identified in the corresponding item.

In some embodiments, each item also includes a link which, when selected, provides additional information related to the item. For example, in one embodiment, if the user selects a discussion item, additional information may be provided (in the same window 1010 or in another window) about when the discussion occurred, who the participants were, the length of the discussion, the topic or other code sections which were also discussed, and the like. In some embodiments, the full recording (audio and/or video) may also be provided, allowing the user to quickly access the entire discussion to determine the context and whether any solutions or ideas where mentioned. Similarly, in an embodiment, if the user selects a record, additional information may be provided, such as when the record was submitted, the participant(s) involved, other sections of code, and the like. Similarly, the Analysis Application 230 may also provide access to the entire original text or recording.

In this way, embodiments of the present disclosure enable users, who may have never interacted with the code before, to efficiently gain a deep and complex understanding of the code. The dynamic visualization allows the user to quickly focus on the sections of code which need the most attention. Further, the user can easily select sections of code to be provided additional information related to the section, which can help the user determine how to proceed and avoids duplication of efforts. Advantageously, embodiments of the present disclosure enable cognitive evaluation of each data source that analyzes the underlying sentiment to provide additional knowledge to users. Embodiments of the present disclosure allow the users to engage with the source code and understand the entire emotional history of the code in ways that were not previously possible.

Figure 11:
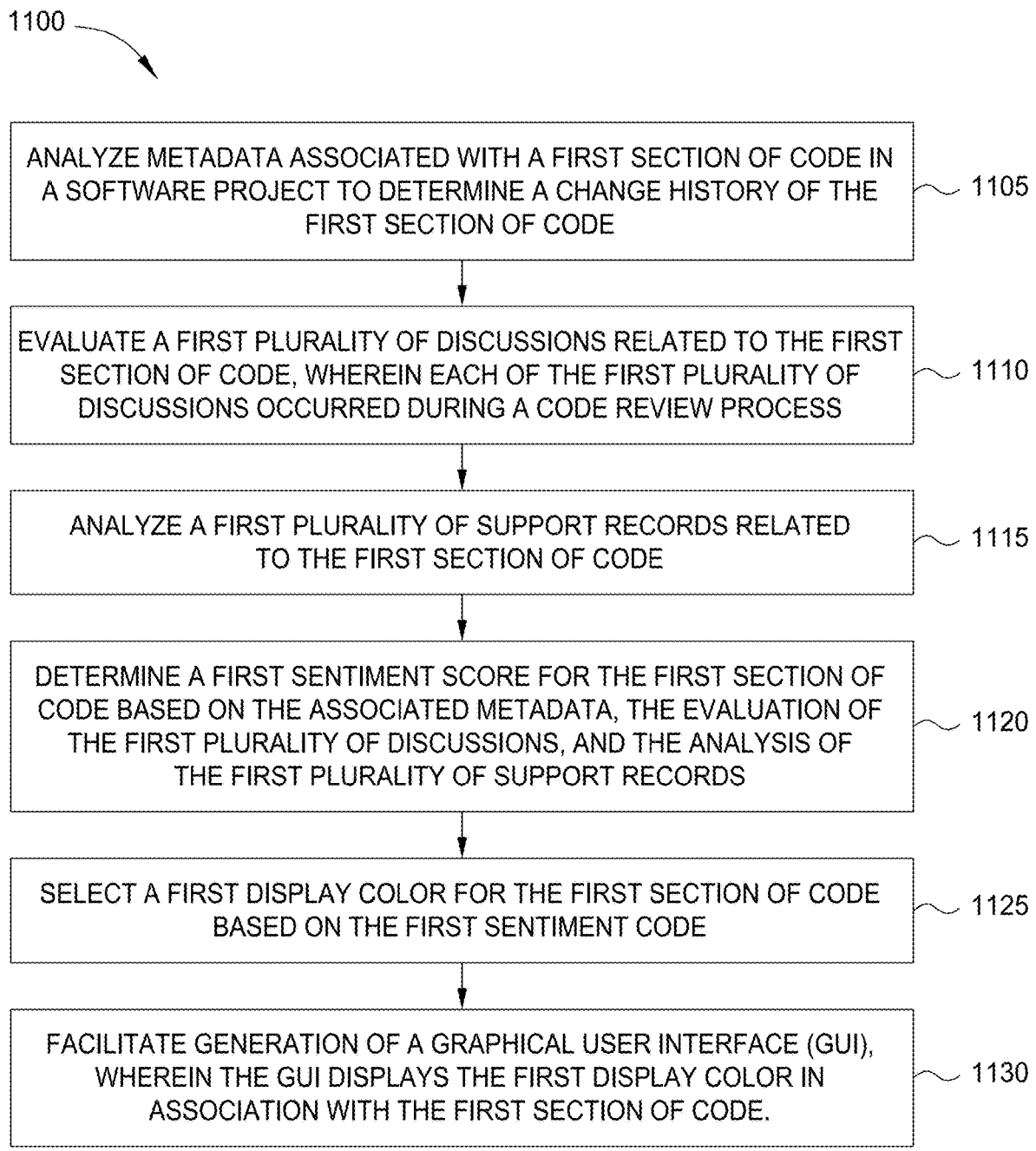
FIG. 11 is a flow diagram illustrating a method for evaluating source code, according to one embodiment disclosed herein.

FIG. 11 is a flow diagram illustrating a method 1100 for evaluating source code, according to one embodiment disclosed herein. The method 1100 begins at block 1105, where the Analysis Application 230 analyzes metadata associated with a first section of code in a software project to determine a change history of the first section of code. At block 1110, the Analysis Application 230 evaluates a first plurality of discussions related to the first section of code, wherein each of the first plurality of discussions occurred during a code review process. The method 1100 then proceeds to block 1115, where the Analysis Application 230 analyzes a first plurality of support records related to the first section of code. At block 1120, the Analysis Application 230 determines a first sentiment score for the first section of code based on the associated metadata, the evaluation of the first plurality of discussions, and the analysis of the first plurality of support records.

Further, at block 1125, the Analysis Application 230 selects a first display color for the first section of code based on the first sentiment score. Finally, at block 1130, the Analysis Application 230 facilitates generation of a graphical user interface (GUI), wherein the GUI displays the first display color in association with the first section of code. In an embodiment, facilitating generation of the GUI includes causing the GUI to display the source code along with the selected display color. In some embodiments, the Analysis Application 230 may itself update the display (such as when the Analysis Application 230 operates on the user's device). In other embodiments, the Analysis Application 230 may provide the selected color to the application(s) responsible for rendering the source code on the user's GUI, along with an indication as to the particular section of code that the color is associated with. In this way, the Analysis Application 230 facilitates the generation of the GUI by causing the GUI to be generated displaying each section of source code along with its associated color.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the preceding features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications (e.g., the Analysis Application 230) or related data available in the cloud. For example, the Analysis Application 230 could execute on a computing system in the cloud and generate sentiment scores for sections of source code. In such a case, the Analysis Application 230 could analyze the various data sources and store the identified related data and generated scores at a storage location in the cloud. Doing so allows a user to access this information from any computing system attached to a network connected to the cloud (e.g., the Internet).

While the foregoing is directed to embodiments of the present invention, other and further embodiments of the invention may be devised without departing from the basic scope thereof, and the scope thereof is determined by the claims that follow.

What is claimed is:
1. A method comprising:
analyzing metadata associated with a first section of code in a software project to determine a change history of the first section of code;
evaluating a first plurality of discussions related to the first section of code, wherein each of the first plurality of discussions occurred during one or more code review processes, comprising:
receiving a recording of a first code review, wherein the recording includes video and audio;
analyzing text on a display visible in the video of the recording of the first code review using optical character recognition (OCR) to delineate the recording into a plurality of segments based on code sections being displayed in each of the plurality of segments;

identifying a first segment of the plurality of segments of the recording during which the first section of code was being discussed, based on determining that the first section of code was being displayed during the first segment;

identifying a second segment of the plurality of segments of the recording during which the first section of code was not being discussed, based on determining that the first section of code was not being displayed during the second segment;

extracting the first segment of the recording; and applying one or more natural language processing (NLP) techniques to the audio of the identified first segment of the recording to determine a discussion score for the first section of code;

analyzing a first plurality of support records related to the first section of code;

determining a first sentiment score for the first section of code based on the associated metadata, the evaluation of the first plurality of discussions, and the analysis of the first plurality of support records;

selecting a first display color for the first section of code based on the first sentiment score;

facilitating generation of a graphical user interface (GUI), wherein the GUI displays the first display color in association with the first section of code; and upon receiving, via the GUI, a selection of the first section of code:

providing, via the GUI, a first link to the identified first segment of the recording of the first code review and providing, via the GUI, a second link to a full recording of the first code review.

2. The method of claim 1, wherein evaluating the first plurality of discussions further comprises: parsing each respective discussion of the first plurality of discussions using one or more natural language processing (NLP) models to identify respective information including: (i) a number of times participants in the respective discussion exceeded a predefined threshold volume, (ii) a number of exclamations in the respective discussion, and (iii) a number of negative expressions in the respective discussion; and determining a respective negativity score for each respective discussion of the first plurality of discussions based on the identified respective information.

3. The method of claim 1, wherein analyzing the first plurality of support records comprises determining a frequency or a number of issues related to the first section of code based on the first plurality of support records.

4. The method of claim 1, wherein the first sentiment score is further determined based on:
(i) a frequency or number of changes in the first section of code;
(ii) a frequency or number of defects related to the first section of code;
(iii) a frequency or number of support issues related to the first section of code;
(iv) a frequency or number of discussions that have focused on the first section of code; and
(v) a frequency or number of electronic communications that related to the first section of code.

5. The method of claim 1, the method further comprising: receiving a new discussion related to the first section of code;
determining, based on evaluating the new discussion, that at least one issue with the first section of code has been resolved;
determining a second sentiment score for the first section of code based on the determination that the at least one issue has been resolved; and
selecting a second display color of the first section of code based on the second sentiment score.

6. The method of claim 1, the method further comprising: upon determining that no support records related to the first section of code have been received for a predefined period of time, determining a second sentiment score for the first section of code; and
selecting a second display color of the first section of code based on the second sentiment score.

7. The method of claim 1, the method further comprising: determining a respective sentiment score for each other section of code in the software project; and
selecting a respective display color of each respective section of code in the software project, based on the respective sentiment score, such that the selected display colors form a heat map illustrating problematic sections of code in the software project.

8. A computer program product comprising: a computer-readable storage medium having computer-readable program code embodied therewith, the computer-readable program code executable by one or more computer processors to perform an operation comprising:

analyzing metadata associated with a first section of code in a software project to determine a change history of the first section of code;

evaluating a first plurality of discussions related to the first section of code, wherein each of the first plurality of discussions occurred during one or more code review processes, comprising:

receiving a recording of a first code review, wherein the recording includes video and audio;

analyzing text on a display visible in the video of the recording of the first code review using optical character recognition (OCR) to delineate the recording into a plurality of segments based on code sections being displayed in each of the plurality of segments;

identifying a first segment of the plurality of segments of the recording during which the first section of code was being discussed, based on determining that the first section of code was being displayed during the first segment;

identifying a second segment of the plurality of segments of the recording during which the first section of code was not being discussed, based on determining that the first section of code was not being displayed during the second segment;

extracting the first segment of the recording; and applying one or more natural language processing (NLP) techniques to the audio of the identified first segment of the recording to determine a discussion score for the first section of code;

analyzing a first plurality of support records related to the first section of code;

determining a first sentiment score for the first section of code based on the associated metadata, the evaluation of the first plurality of discussions, and the analysis of the first plurality of support records;

selecting a first display color for the first section of code based on the first sentiment score;

facilitating generation of a graphical user interface (GUI), wherein the GUI displays the first display color in association with the first section of code; and upon receiving, via the GUI, a selection of the first section of code: providing, via the GUI, a first link to the identified first segment of the recording of the first code review and providing, via the GUI, a second link to a full recording of a first code review.

9. The computer program product of claim 8, wherein evaluating the first plurality of discussions further comprises:
 parsing each respective discussion of the first plurality of discussions using one or more natural language processing (NLP) models to identify respective information including: (i) a number of times participants in the respective discussion exceeded a predefined threshold volume, (ii) a number of exclamations in the respective discussion, and (iii) a number of negative expressions in the respective discussion; and determining a respective negativity score for each respective discussion of the first plurality of discussions based on the identified respective information.

10. The computer program product of claim 8, wherein the first sentiment score is further determined based on:
 (i) a frequency or number of changes in the first section of code;
 (ii) a frequency or number of defects related to the first section of code;
 (iii) a frequency or number of support issues related to the first section of code;
 (iv) a frequency or number of discussions that have focused on the first section of code; and
 (v) a frequency or number of electronic communications that related to the first section of code.

11. The computer program product of claim 8, the operation further comprising:
 receiving a new discussion related to the first section of code;
 determining, based on evaluating the new discussion, that at least one issue with the first section of code has been resolved;
 determining a second sentiment score for the first section of code based on the determination that the at least one issue has been resolved; and
 selecting a second display color of the first section of code based on the second sentiment score.

12. The computer program product of claim 8, the operation further comprising:
 upon determining that no support records related to the first section of code have been received for a predefined period of time, determining a second sentiment score for the first section of code; and
 selecting a second display color of the first section of code based on the second sentiment score.

13. A system comprising:
 one or more computer processors; and
 a memory containing a program which when executed by the one or more computer processors performs an operation, the operation comprising:
 analyzing metadata associated with a first section of code in a software project to determine a change history of the first section of code;
 evaluating a first plurality of discussions related to the first section of code, wherein each of the first plurality of discussions occurred during one or more code review processes, comprising:
 receiving a recording of a first code review, wherein the recording includes video and audio;
 analyzing text on a display visible in the video of the recording of the first code review using optical character recognition (OCR) to delineate the recording into a plurality of segments based on code sections being displayed in each of the plurality of segments;
 identifying a first segment of the plurality of segments of the recording during which the first section of code was being discussed, based on determining that the first section of code was being displayed during the first segment;
 identifying a second segment of the plurality of segments of the recording during which the first section of code was not being discussed, based on determining that the first section of code was not being displayed during the second segment;
 extracting the first segment of the recording; and
 applying one or more natural language processing (NLP) techniques to the audio of the identified first segment of the recording to determine a discussion score for the first section of code analyzing a first plurality of support records related to the first section of code;
 determining a first sentiment score for the first section of code based on the associated metadata, the evaluation of the first plurality of discussions, and the analysis of the first plurality of support records;
 selecting a first display color for the first section of code based on the first sentiment score; and
 facilitating generation of a graphical user interface (GUI), wherein the GUI displays the first display color in association with the first section of code; and
 upon receiving, via the GUI, a selection of the first section of code:
 providing, via the GUI a first link to the identified first segment of the recording of the first code review;
 and providing, via the GUI, a second link to a full recording of a first code review.

14. The system of claim 13, wherein evaluating the first plurality of discussions further comprises:
 parsing each respective discussion of the first plurality of discussions using one or more natural language processing (NLP) models to identify respective information including: (i) a number of times participants in the respective discussion exceeded a predefined threshold volume, (ii) a number of exclamations in the respective discussion, and (iii) a number of negative expressions in the respective discussion; and determining a respective negativity score for each respective discussion of the first plurality of discussions based on the identified respective information.

15. The system of claim 13, wherein the first sentiment score is further determined based on:
 (i) a frequency or number of changes in the first section of code;
 (ii) a frequency or number of defects related to the first section of code;
 (iii) a frequency or number of support issues related to the first section of code;
 (iv) a frequency or number of discussions that have focused on the first section of code; and
 (v) a frequency or number of electronic communications that related to the first section of code.

16. The system of claim 13, the operation further comprising:
 receiving a new discussion related to the first section of code;
 determining, based on evaluating the new discussion, that at least one issue with the first section of code has been resolved;

determining a second sentiment score for the first section of code based on the determination that the at least one issue has been resolved; and selecting a second display color of the first section of code based on the second sentiment score.

17. The system of claim 13, the operation further comprising:

upon determining that no support records related to the first section of code have been received for a predefined period of time, determining a second sentiment score for the first section of code; and selecting a second display color of the first section of code based on the second sentiment score.

\* \* \* \* \*